United States Patent Office 3,745,218
Patented July 10, 1973

3,745,218
PRESERVATION PROCESS USING 2-(4-HYDROXY-PHENYL)-BENZOFURAN
Leonard Jurd, Berkeley, and Alfred Douglas King, Jr., Martinez, Calif., assignors to the United States of America as represented by the Secretary of Agriculture
No Drawing. Original application Feb. 27, 1970, Ser. No. 15,302. Divided and this application Mar. 26, 1971, Ser. No. 128,580
Int. Cl. A61k 27/00; A61l 13/00, 23/00
U.S. Cl. 424—285                              1 Claim

ABSTRACT OF THE DISCLOSURE

Process for preserving a substance normally subject to spoilage by yeasts or bacteria which comprises incorporating with the substance an amount of 2-(4-hydroxyphenyl) - benzofuran which is sufficient to inhibit the the growth of yeasts and bacteria.

---

This is a division of our co-pending application Ser. No. 15,302, filed Feb. 27, 1970.

Certain of the subject matter disclosed herein, in particular the synthesis of quercetin derivatives, is the sole invention of Leonard Jurd and is claimed in his co-pending application Ser. No. 18,314, filed Mar. 10, 1970, now Pat. 3,661,890.

A non-exclusive, irrevocable, royalty-free license in the invention herein described, throughout the world for all purposes of the United States Government, with the power to grant sublicenses for such purposes, is hereby granted to the Government of the United States of America.

This invention relates to the preservation of seubstances which are normally subject to microbial spoilage. The objects of the invention include the provision of novel processes and compositions for accomplishing such preservation. Further objects of the invention will be evident from the following disclosure wherein parts and percentages are by weight unless otherwise specified. The abbreviation p.p.m. used herein refers to parts per million. Temperatures are given in degrees centigrade.

In accordance with the invention it has been found that certain agents exhibit unexpected antimicrobial activity and are useful for preserving all kinds of materials which are normally subject to microbial spoilage. The agents in question are certain derivatives of quercetin, coumarin, and benzofuran, and their antimicrobial activity is totally unusual and unexpected because it is not shared by closely-related derivatives, including isomers. The agents having these important and technically-useful properties are next described in detail.

Certain derivatives of quercetin are included among the agents of the invention. Quercetin is a known compound having the structure:

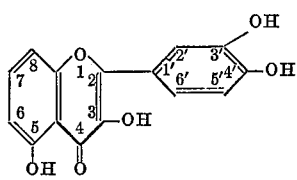

One of the agents of the invention is the compound 3-O-methylquercetin. Its structure can be visualized from Formula I wherein the substituent at the 3 position is —OCH$_3$ rather than OH. It has been found that 3-O-methylquercetin is especially active against bacteria and in a series of tests it was shown to be effective against 12 out of a total of 13 different types of bacteria tested whereas many other quercetin ethers display little if any antibacterial activity.

Another of the agents of the invention is a mixture of 5-O-methylquercetin and 7-O-methylquercetin. In a series of tests this mixture was found to be effective against 10 out of a total of 13 different types of bacteria tested whereas the individual isomers (5-O-methyl- and 7-O-methylquercetin) display virtually no antibacterial activity.

The agents in accordance with the invention also include 4-methoxycoumarin which has the structure—

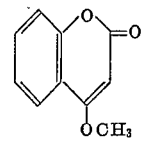

and 7-methoxycoumarin which has the structure—

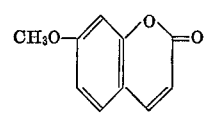

These compounds are especially active against molds and yeasts. In a series of tests they were shown to be effective against 5 out of 5 molds tested, and against 6 to 7 out of 7 yeasts tested. On the other hand, many other derivatives of coumarin were found to have little if any activity against molds or yeasts.

Another of the agents of the invention is 2-(4-hydroxyphenyl)-benzofuran which has the structure—

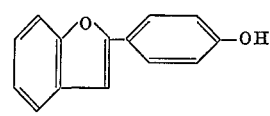

This compound is especially active against yeasts and is also active against some molds—*Aspergillus glaucus* and a brown rot mold of the genus *Sclerotinia*, for example—and many bacteria. In a series of tests the compound in question was shown to be effective against 8 out of a total of 8 different yeasts, and against 8 out of a total of 13 different bacteria. Various other benzofuran derivatives were found to be virtually inactive against yeasts and bacteria.

The invention encompasses not only the use of any of the above-described agents individually, but also mixtures thereof. For example, where it is desired to inhibit the prliferation of molds and yeasts plus bacteria, one would employ a composite of (a) 3-O-methylquercetin or the mixture of 5-O-methyl- and 7-O-methylquercetin plus (b) 4-methoxy- or 7-methoxycoumarin. Further extensions of this principle will be obvious from the foregoing illustration.

In preserving substances in accordance with the invention, any of the aforesaid agents or mixtures thereof are incorporated with the substance, using an amount of the agent to inhibit microbial growth. Additional conventional treatments such as dehydration, canning, refrigeration, or freezing may be applied to the substance containing the added agent. The incorporation of the agent with the substance may involve a mixing of the substance and the agent—this is especially suitable where the substance is in liquid or particulate form. Where the substance is in the form of pieces of large dimensions the agent may be incorporated therewith by coating it on the surface of the pieces. For such purpose the agent is preferably dispersed in a carrier—a liquid such as water, alcohol, water-alcohol blends, or a finely-divided solid such as salt, starch, talc, or the like.

The invention is of wide versatility and can be applied for the preservation of all kinds of substances which are normally subject to microbial spoilage. Typical examples of such substances are listed below by way of example. Foodstuffs such as fruits, vegetables, juices, milk, eggs, meat, fish, grains, cereal products, cheese, etc. Animal glues and mucilages; dextrins; starch pastes and solution; cosmetic, medicinal, and dental preparations; vitamin preparations; pastes, solutions, or other preparations of natural gums such as tragacanth, Arabic, acacia, karaya, locust bean, agar-agar, pectin, algin, etc., fermentation broths, mashes, and residues from fermentation processes; whey; wines and vinegars; animal feeds and ingredients of animal feeds such as fish meals, blood meals, feather meal, meat scraps, bone meal, tankage, grains, and oil-seed meals; proteins and protein hydrolysates; textile printing pastes; paints containing proteins or other spoilable dispersing agent; solutions of bark extracts or other tanning agents; molasses; by-products or wastes that contain potentially valuable carbohydrate, proteinous or fat ingredients such as stick liquor, corn steep liquor, fruit cannery wastes, citrus peels, cull fruit and vegetables, tops of root vegetables, distillers' slops, pulp liquors, wash water from textile de-sizing operations, waste liquors from wool scouring plants, dairy and slaughter house wastes and liquors, etc.

The invention is further demonstrated by the following illustrative examples.

EXAMPLE 1

Synthesis of 3-O-methylquercetin (Method A)

(a) Preparation of 5,7,3',4'-tetra-O-benzoyl quercetin.—Benzoyl chloride (80 ml.) was added in two portions during 10 minutes to a solution of rutin (20 g.) and potassium carbonate (160 g.) in water (1.5 l.). After 40 minutes the precipitated solid was collected and dissolved in boiling ethanol (300 ml.). Concentrated hydrochloric acid (60 ml.) was added and the clear solution was heated on a steam bath for 1 hour. Water (250 ml.) was added. The oil which separated solidified on cooling. It was collected, dissolved in acetone, diluted with methanol and concentrated until most of the acetone had distilled. The crystalline solid which separated from the hot methanol solution was collected (8.4 g.; M.P. 204–205°). Recrystallized from acetone-methanol, the 5,7,3',4'-tetrabenzoate separated as slightly yellow, granular crystals, M.P. 209° (7.8 g.). If the tetrabenzoate is allowed to crystallize slowly from acetone alone it separates in cream-colored needles which melt at about 126–130°, resolidify and then melt at 209°.

Calcd. for $C_{43}H_{26}O_{11}$ (percent): C, 71.85; H, 3.65. Found (percent): C, 71.4; H, 3.71.

(b) Preparation of 3-O-methyl-5,7,3',4'-tetra-O-benzoyl quercetin.—5,7,3',4'-tetra-O-benzoyl quercetin (19.5 g.) was methylated with dimethyl sulphate (25.0 ml.), potassium carbonate (40 g.) and acetone (500 ml.) for 2 hours. The product, isolated in the usual way, crystallized from ethyl acetate and from acetone-methanol as colorless needles, M.P. 181° (16.8 g.).

Calcd. for $C_{44}H_{28}O_4$ (percent): C, 72.1; H, 3.85; 1 MeO—, 4.24. Found (percent): C, 71.7; H, 3.96; MeO—, 4.77.

(c) Preparation of 3-O-methylquercetin.—Potassium hydroxide (15 g.) was added to a suspension of 11 g. of product b in warm methanol (100 ml.). The resulting clear solution was diluted with water (100 ml.), warmed for 5 minutes and acidified. The mixture was concentrated until most of the methanol had distilled. The yellow product was collected, washed with benzene and recrystallized from aqueous methanol. 3-O-methylquercetin separated as yellow needles, M.P. 275° (lit. M.P. 273–275°) (4.1 g.).

Calcd. for $C_{16}H_{12}O_7$ (percent): C, 60.75; H, 3.83; 1 MeO—, 9.87. Found (percent): C, 60.8; H, 3.90; MeO—, 9.73.

EXAMPLE 2

Synthesis of 3-O-methylquercetin (Method B)

3,5-dihydroxy-7-benzyloxy-3',4'-diphenylmethylenedioxyflavone.—A mixture of 7-O-benzylquercetin (4.3 g.) and α,α'-dichlorodiphenylmethane (2.9 g.; 1.1 mol. equivs.) was heated in an oil-bath at 220° for 5 minutes, cooled and dissolved in acetone (50 ml.). The solution was concentrated and diluted with methanol. The crystalline product (4.1 g.) was recrystallized from acetone-methanol. 3.5-dihydroxy-7-benzyloxy-3',4'-diphenylmethylenedioxyflavone was obtained as yellow granular crystals, M.P., 180°.

Calcd. for $C_{35}H_{24}O_7$ (percent): C, 75.5; H, 4.35. Found (percent): C, 75.3; H, 4.32.

5-hydroxy-3-methoxy-7-benzyloxy-3',4'-diphenylmethylenedioxyflavone.—The 3,5-dihydroxy compound (1.4 g.) was methylated with dimethyl sulphate (0.35 g.; 1.1 mol. equivs.), potassium carbonate and acetone in the usual way. The product, 5-hydroxy-3-methoxy-7-benzyloxy-3',4'-diphenylmethylenedioxyflavone, separated from acetone-methanol as yellow needles, M.P. 170° (1.2 g.). With alcoholic ferric chloride it gave an intense green-brown color.

Calcd. for $C_{36}H_{26}O_7$ (percent): C, 75.8; H, 4.60; MeO—, 5.4. Found (percent): C, 75.8; H, 4.57; MeO—, 5.46.

The above methyl ether (1.0 g.) was heated on a steam bath for 30 minutes with glacial acetic acid (15.0 ml.) and concentrated hydrochloric acid (15.0 ml.) Water (400 ml.) and benzene (50 ml.) were added and the yellow solid was collected. Recrystallized from aqueous methanol, 3-O-methylquercetin, M.P. and mixed M.P. 275°, was obtained (0.3 g.).

EXAMPLE 3

Synthesis of 5-O-methyl- and 7-O-methylquercetin

5-O-methyl- and 7-O-methylquercetin.—A mixture of quercetin 3,7,3',4'-tetraacetate (4.70 g.), dimethyl sulfate (2.50 g.), anhydrous potassium carbonate (5.0 g.) and anhydrous acetone (50.0 ml.) was heated under reflux for one hour and filtered. The acetone filtrate was evaporated to an oil. This was dissolved in 95% ethanol (20.0 ml.) and 50% aqueous sulfuric acid (5.0 ml.) and the solution heated for one hour. Yellow crystals separated (1.0 g.). These were collected and the filtrate diluted with more water, was heated for a further two hours whereupon a second crop of crystals separated. The combined crystalline products were digested with methanol (20 ml.) and water (40 ml.) leaving a yellow solid (2.41 g.). Silicic chromatography of the product showed that this solid consisted primarily of a mixture of the 5-O-methylquercetin and 7-O-methylquercetin. The 5-O-methylquercetin constituent of this mixture can be obtained by repeated recrystallization from acetone-methanol. It separates as yellow needles, M.P. 308–309°. On heating with acetic anhydride and sodium acetate it forms 5-O-methylquercetin tetraacetate, M.P. 199–200°.

The quercetin 3,7,3',4'-tetraacetate used as starting material for the above synthesis was prepared by adding pyridine (20 ml.) to a stirred suspension of quercetin (60 g.) in acetic anhydride (180 ml.). After four minutes excess of water was added and the solid was collected. Recrystallized from acetone-methanol quercetin 3,7,3',4'-tetraacetate separated as pale yellow needles, M.P. 190—191° (70 g.). These gave an intense red color with alcoholic ferric chloride.

EXAMPLE 4

Synthesis of 7-O-benzoylquercetin

Benzoyl chloride (25.0 ml.) was added to a vigorously stirred solution of rutin (20.0 g.) and borax (30 g.) in water (400 ml.) at room temperature. After 10 minutes precipitated benzoic acid was filtered and the filtrate was treated with concentrated hydrochloric acid (100 ml.) and heated on a steam-bath for 30 minutes. The yellow solid which separated was collected and recrystallized from acetone-methanol (10.3 g.). The product, 7-O-benzoylquercetin, separated as yellow needles, M.P. 231–232°, which gave an intense green-brown color with alcoholic ferric chloride.

Calcd. for $C_{22}H_{14}O_8$ (percent): C, 65.0; H, 3.47. Found (percent): C, 65.1; H, 3.67.

Acetylation of the product yields 7-O-benzoylquercetin tetraacetate which crystallizes from methanol as colored needles, M.P. 184–185°.

Calcd. for $C_{30}H_{22}O_{12}$ (percent): C, 62.7; H, 3.86. Found (percent): C, 62.7; H, 3.99.

EXAMPLE 5

A lot of fresh skim milk was divided into two 100-ml. samples. Into one sample was incorporated sufficient 3-O-methyl quercetin to give a concentration thereof of 500 p.p.m. Each sample was inoculated by adding 1 ml. of skim milk which had been allowed to stand at room temperature for several hours. The two samples was then held in an incubator at 28° C. for 3 days and examined at the end of this period. The control sample was found to be separated into curds and whey; the treated sample was still homogeneous.

EXAMPLE 6

A lot of grape juice was divided into two 100-ml. samples. Into one sample was incorporated 2-(4-hydroxyphenyl)-benzofuran in a concentration of 500 p.p.m. Both samples were inoculated with wine yeast (*Saccharomyces cerevisiae*) at a concentration of about $2.5 \times 10^4$ cells per sample. The samples were then stored at 28° C. for several days.

On the third day it was observed that the control juice was foamy-indicating that active fermentation was taking place. The treated juice was not foaming at all.

On the fourth day the two samples were assayed for yeast cell count. The following results were obtained:
Treated juice: ∠10 yeast cells/ml.
Control juice: $7 \times 10^7$ yeast cells/ml.

EXAMPLE 7

A series of derivatives of quercetin, coumarin, and benzofuran were assayed for effectiveness against bacteria, molds, and yeasts, using the following test procedure:

All compounds are tested at the concentration of 500 p.p.m. (w./v.) using premeasured amounts of agar containing the compound from test tubes or dispensing pipettes to measure 10 ml. of sterile medium into 60 x 15 mm. plastic Petri plates. Because of the relative insolubility of some of the compounds the weighed compound is mixed with gum tragacanth (0.2%) in a ground glass tissue homogenizer. A few ml. of water are added during grinding to aid in suspending the compound in the agar medium prior to steam sterilizing (15 p.s.i.g. for 15 minutes). Plate count agar (Difco) (pH 7.3) or potato dextrose agar (Difco) (pH 5.6) are used for bacterial or yeast and mold culture, respectively.

The inoculum is prepared from 24- or 48-hour cultures of bacteria grown on tryptone glucose yeast extract broth, yeast grown on Sabouraud maltose broth, or fungi grown on potato dextrose agar. Turbidity measurements of bacterial and yeast suspensions are used as a means of estimating the number of cells per ml. of broth. Dilutions in 0.1% peptone water are then made to give between 30 and 300 colonies per Petri plate. The mold cultures are scraped off the surface of the slant and macerated in a Waring Blendor for 1 minute with 100 ml. of sterile peptone water. The solid medium in the Petri plate is inoculated by placing a loopful of the mold macerate in the center of the plate. Control plates contain medium, gum tragacanth, and the microorganism.

After incubation of 30° C. or 35° C. the results are evaluated after 48 hours and again after 1, 2, and 3 weeks. The bacteria and yeast data are determined by counting colonies under a 7× wide field microscope. The results are expressed on the basis:

+ for effective to inhibit growth

− for ineffective, growth occurs

In conducting the assays, each candidate agent was preliminarily tested for effectiveness against 1 to 3 microbial species, e.g., *B. cereus*, *E. coli*, and *P. aeruginosa*, in the case of tests for activity against bacteria. Where the agent exhibited little or no activity in this preliminary screening, no further assays were carried out therewith, except in a few cases as will be evident below. A similar plan was followed in testing the candidate agents against other types of microorganisms, using in the preliminary tests *A. glaucus* in the case of molds, and *S. rouxii* and *S. mallis* in the case of yeasts.

The results are summarized in the following tables.

TABLE I.—ACTIVITY OF QUERCETIN DERIVATIVES AGAINST BACTERIA

| Compound tested | Achromobacter hartlebii | Aerobacter aerogenes | Alcaligenes faecalis | Bacillus cadaveris | Bacillus cereus | Bacillus megatherium | Escherichia coli | Micrococcus lysodikticus | Proteus vulgaris | Pseudomonas aeruginosa | Serratia marcescens | Staphylococcus aureus | Streptococcus mitis |
|---|---|---|---|---|---|---|---|---|---|---|---|---|---|
| Quercetin | + | − | − | − | + | | − | + | − | − | − | − | |
| Dihydroquercetin | | | | | + | | | | | | | | |
| Quercetin 3-rutinoside | | | | | − | | − | | | | − | | |
| Quercetin 3-rhamnoside | | | | | − | | − | | | | − | | |
| 7-O-benzoylrutin | | | | | − | | − | | | | − | | |
| 7-O-allylquercetin | | | | | + | | − | + | + | − | | − | + |
| 4′,7-di-O-allyl-quercetin | − | − | − | − | + | − | − | + | + | − | − | − | + |
| 7-O-benzoyl-quercetin | + | − | − | − | + | + | − | + | + | − | − | | |
| 7-O-benzyl-quercetin | | | | | − | | − | | | | − | | |
| 4′,7-di-O-benzyl-quercetin | | | | | − | | − | | | | − | | |
| 3-O-methyl-quercetin | + | + | + | + | + | + | + | + | + | + | − | + | + |
| 5-O-methyl-quercetin | | | | | + | | + | | | | − | | |
| 7-O-methyl-quercetin | | | | | − | | − | | | | − | | |
| 5-O-methyl- plus 7-O-methyl-quercetin | + | − | + | + | + | + | − | + | + | + | − | + | + |
| 3,5-di-O-methyl-quercetin | | | | | − | | − | | | | − | | |
| 3,7-di-O-methyl-quercetin | | | | | − | | − | | | | − | | |
| 4′,7-di-O-methyl-quercetin | | | | | + | | − | | | | − | | |

TABLE I.—Continued ACTIVITY OF QUERCETIN DERIVATIVES AGAINST BACTERIA

| Compound tested | Achromobacter hartlebii | Aerobacter aerogenes | Alcaligenes faecalis | Bacillus cadaveris | Bacillus cereus | Bacillus megatherium | Escherichia coli | Micrococcus lysodeikticus | Proteus vulgaris | Pseudomonas aeruginosa | Serratia marcescens | Staphylococcus aureus | Stroptococcus mitis |
|---|---|---|---|---|---|---|---|---|---|---|---|---|---|
| 5,7-di-O-methylquercetin | | | | | − | | − | | − | | | | |
| 3,3',5-tri-O-methylquercetin | | | | | − | | − | | − | | | | |
| 7,3',4'-tri-O-methylquercetin | | | | | − | | − | | − | | | | |
| 7,3,3',4'-tetra-O-methylquercetin | | | | | − | | − | | − | | | | |
| 5,7,3,3',4'-penta-O-methylquercetin | | | | | − | | − | | − | | | | |

TABLE II.—ACTIVITY OF COUMARIN DERIVATIVES AGAINST MOLDS

| Compound tested | Aspergillus glaucus | Aspergillus oryzae | Aspergillus niger | Botrytis cinerea | Byssochlamys fulva |
|---|---|---|---|---|---|
| 4-methoxycoumarin | + | + | + | + | + |
| 4-hydroxycoumarin | − | | | | |
| 4-allyloxycoumarin | + | | | | |
| 4-benzoyloxycoumarin | − | | | | |
| 7-methoxycoumarin | + | + | + | + | + |
| 7-hydroxycoumarin | − | | | | |
| 7-geranoxycoumarin | − | | | | |
| 7-allyloxycoumarin | − | | | | |
| 7-benzoyloxycoumarin | − | | | | |
| 8-methoxycoumarin | + | | | | |
| 5-geranoxy-7-methoxycoumarin | − | | | | |
| 5,7-di-methoxycoumarin | + | | | | |
| 5-hydroxy-7-methoxycoumarin | − | | | | |
| 7-hydroxy-6-methoxycoumarin | − | | | | |

TABLE III.—ACTIVITY OF COUMARIN DERIVATIVES AGAINST YEASTS

| Compound tested | Zygosaccharomyces Japonica var. soya | Zygosaccharomyces barkeri | Hanseniaspora melligeri | Pichia chodati var. fermentans | Candida chalmersi | Candida tropicalis | Saccharomyces rouxii | Saccharomyces mallis |
|---|---|---|---|---|---|---|---|---|
| 4-methoxycoumarin | + | − | + | + | + | − | + | + |
| 4-hydroxycoumarin | − | | | | | | − | − |
| 4-allyloxycoumarin | | | | | | | − | − |
| 4-benzoyloxycoumarin | | | | | | | − | − |
| 7-methoxycoumarin | + | − | + | + | + | + | + | + |
| 7-hydroxycoumarin | | | | | | | − | − |
| 7-geranoxycoumarin | | | | | | | − | − |
| 7-allyloxycoumarin | | | | | | | − | − |
| 7-benzoyloxycoumarin | | | | | | | − | − |
| 8-methoxycoumarin | | | | | | | − | − |
| 5-geranoxy-7-methoxycoumarin | | | | | | | − | − |
| 5,7-di-methoxycoumarin | | | | | | | + | + |
| 5-hydroxy-7-methoxycoumarin | | | | | | | − | − |
| 7-hydroxy-6-methoxycoumarin | | | | | | | + | − |

TABLE IV.—ACTIVITY OF BENZOFURAN DERIVATIVES AGAINST YEASTS

| Compound tested | Zygosaccharomyces japonica var. soya | Zygosaccharomyces barkeri | Hanseniaspora melligeri | Pichia chodati var. fermentans | Candida chalmersi | Candida tropicalis | Saccharomyces rouxii | Saccharomyces mallis |
|---|---|---|---|---|---|---|---|---|
| 2-(4-hydroxyphenyl)-benzofuran | + | + | + | + | + | + | + | + |
| 2-(4-methoxyphenyl)-3-acetylbenzofuran | | | | | | | − | − |
| 2-(4-hydroxyphenyl)-3-acetylbenzofuran | | | | | | | − | − |
| 2-(4-hydroxyphenyl)-6-hydroxy-3-acetylbenzofuran | | | | | | | − | − |
| 2-(4-hydroxyphenyl-7-methoxy-3-acetylbenzofuran | | | | | | | − | − |
| Coumestrol | | | | | | | − | − |
| Coumestrol diacetate | | | | | | | − | − |
| Di-O-methylcoumestrol | | | | | | | − | − |

TABLE V.—ACTIVITY OF BENZOFURAN DERIVATIVES AGAINST BACTERIA

| Compound tested | Achromobacter hartlebii | Aerobacter aerogenes | Alcaligenes faecalis | Bacillus cadaveris | Bacillus cereus | Bacillus megatherium | Escherichia coli | Micrococcus lysodeikticus | Proteus vulgaris | Pseudomonas aeruginosa | Serratia marcescens | Staphylococcus aureus | Streptococcus mitis |
|---|---|---|---|---|---|---|---|---|---|---|---|---|---|
| 2-(4-hydroxyphenyl) benzofuran. | + | − | − | + | + | + | + | − | + | + | − | + | + |
| 2-(4-methoxyphenyl)-3-acetylbenzofuran. | | | | | − | | − | | − | | | − | |
| 2-(4-hydroxyphenyl)-3-acetylbenzofuran. | | | | | − | | − | | − | | | − | |
| 2-(4-hydroxyphenyl)-6-hydroxy-3-acetylbenzofuran. | | | | | − | | − | | − | | | − | |
| 2-(4-hydroxyphenyl)-7-methoxy-3-acetylbenzofuran. | | | | | − | | − | | − | | | − | |
| Coumestrol | | | | | − | | − | | − | | | − | |
| Coumestrol diacetate | | | | | + | | − | | − | | | − | |
| di-O-methyl coumestrol. | | | | | − | | − | | − | | | − | |

Having thus described the invention, what is claimed is:

1. A method for inhibiting the growth of yeasts, which comprises applying thereto an amount of 2-(4-hydroxyphenyl)-benzofuran sufficient to inhibit the growth of yeasts.

References Cited

Deltour et al.: Chem. Abst., vol. 60 (1964), p. 6102g.

SAM ROSEN, Primary Examiner